United States Patent [19]

Fruzzetti

[11] Patent Number: 4,558,587
[45] Date of Patent: Dec. 17, 1985

[54] BALL-TYPE VACUUM VALVE FOR LEAK DETECTION APPARATUS

[75] Inventor: Paul R. Fruzzetti, N. Easton, Mass.

[73] Assignee: Varian Associates, Inc., Palo Alto, Calif.

[21] Appl. No.: 645,473

[22] Filed: Aug. 29, 1984

[51] Int. Cl.⁴ .................... G01M 3/20; F16K 31/06
[52] U.S. Cl. .................... 73/40.7; 251/263; 251/129.14; 137/901
[58] Field of Search .................... 137/DIG. 2; 73/40.7; 251/129, 263, 251, 262

[56] References Cited

U.S. PATENT DOCUMENTS

| | | | |
|---|---|---|---|
| 272,040 | 2/1883 | Graham | 251/263 |
| 1,479,110 | 1/1924 | Skelly | 137/DIG. 2 |
| 1,778,668 | 10/1930 | Graham | 137/DIG. 2 |
| 1,839,413 | 1/1932 | Sage | 137/DIG. 2 |
| 1,915,553 | 6/1933 | Shindel | 251/263 |
| 3,342,990 | 9/1967 | Barrington et al. | 73/40.7 |
| 3,416,359 | 12/1968 | Durbin et al. | 73/40.7 |
| 3,626,760 | 12/1971 | Briggs et al. | 73/40.7 |
| 3,645,127 | 2/1972 | Mongodin et al. | 73/40.7 |
| 3,690,151 | 9/1972 | Briggs | 73/40.7 |
| 3,752,179 | 8/1973 | Atkins et al. | 137/DIG. 2 |
| 3,887,162 | 6/1975 | Antoni et al. | 251/129 |
| 3,968,675 | 7/1976 | Briggs | 73/40.7 |
| 4,290,152 | 9/1981 | Kesselman, Sr. | 137/DIG. 2 |
| 4,419,882 | 12/1983 | Ishii et al. | 73/40.7 |
| 4,499,752 | 2/1985 | Fruzzetti et al. | 73/40.7 |

FOREIGN PATENT DOCUMENTS

| | | | |
|---|---|---|---|
| 372888 | 10/1963 | Switzerland | 251/129 |
| 2095797 | 10/1982 | United Kingdom | 251/129 |

OTHER PUBLICATIONS

Worthington, New Developments in Trapless Leak Detection, Vacuum Technology Research/Development, 1976.

Primary Examiner—S. Clement Swisher
Assistant Examiner—Hezron E. Williams
Attorney, Agent, or Firm—Stanley Z. Cole; Kenneth L. Warsh

[57] ABSTRACT

In a system for leak detection having many valves, it is desirable to have high vacuum valves operated by solenoids at opposite ends of a diffusion pump in order to isolate the diffusion pump during powr failure or during an intentional shutdown. A valve having a hard spherical ball fitting a vacuum seal and having a spring means to bias the ball in a closed position will close during a power failure. A bell-shaped actuator connected to a solenoid can be used to open the valve with built-in mechanical advantage. A circuit means can be used to supply high starting voltage to the solenoid and then lower voltage to hold the valve open.

9 Claims, 5 Drawing Figures

BALL-TYPE VACUUM VALVE FOR LEAK DETECTION APPARATUS

FIELD OF THE INVENTION

This invention relates to a valve for use in a vacuum system such as in a leak detection system and more particularly to a vacuum valve which is efficiently operable by use of a low power solenoid.

BACKGROUND OF THE INVENTION

In the prior art, it is known to detect leaks in equipment being tested for leaks (test equipment) by detecting how much of a test gas which is a light gas, such as helium, flows into or out of the test equipment and then into a test port of the leak detection system. The leak detection system contains a filter that passes the light gas and rejects heavier gases. Test gas passed through the filter flows to a gas monitoring instrument, such as a mass spectrometer. The test port is evacuated to a relatively low vacuum by a mechanical fore or roughing pump while the filter and monitoring instrument are evacuated to a higher vacuum, generally by the combination of the forepump and a higher vacuum pump, such as a diffusion pump (which can also serve as the filter). It is also necessary to vent the test equipment and/or monitoring instrument to the atmosphere from time to time. While the test equipment and monitoring instrument are vented, it is desirable to disconnect the pumps from the test equipment and the monitoring instrument, so that the pumps can be maintained in a vacuum state during venting and are not excessively loaded after venting. After venting has been performed, the roughing pump is connected to the test equipment and monitoring instrument to evacuate them to a low vacuum level while the diffusion pump remains in a high vacuum state and no gas is permitted to flow into it. After the test equipment and monitoring instrument have been evacuated to the low vacuum level by the roughing pump, the diffusion pump is connected to the monitoring instrument to reduce the pressure in it to the high vacuum level. If only the test equipment is vented, somewhat the same sequence is followed except that the monitoring instrument remains connected to the diffusion pump at all times, but a flow path between the diffusion pump and both of the roughing pump and vacuum equipment is blocked.

One type of prior art system, as disclosed in Briggs, U.S. Pat. No. 3,690,151, commonly assigned with the present invention, employs a diffusion pump as a filter to pass the light gas to the monitoring instrument to the exclusion of heavier gases, as well as for the usual purpose of evacuating the monitoring instrument. The diffusion pump effectively functions as a filter to enable a significant percentage of the light gas to flow to the monitoring instrument, while virtually preventing the flow of heavy gases, such as water vapor and nitrogen. There is back-diffusion of the light gas through vaporized jets of a diffusion pump fluid, usually an organic oil. The heavy gases, however, cannot back-diffuse through the oil vapor jet as easily. The monitoring instrument is responsive only to the light gas leaking from the test equipment and relatively accurate indications of the amount of light gas leaking from the test equipment are obtained. Commercial equipment utilizing this principle has been extensively marketed under the trademark "CONTRA-FLOW". Further improvements in the design of a leak detection system are disclosed in an application entitled "Counterflow Leak Detector With Cold Trap," Ser. No. 506,737, filed June 22, 1983 and commonly assigned.

Prior art leak detectors utilizing a filter, as described broadly above, or in connection with the "CONTRA-FLOW" type device, have employed several valve assemblies to provide the required isolation between the diffusion pump, roughing pump, test port, filter and/or analyzing instrument. The several valves must be activated in a particular sequence to provide the required isolation during venting of the test equipment and/or the monitoring instrument. The valves must also provide isolation between the diffusion pump and roughing pump as well as the test equipment and monitoring instrument during transitional periods when the test equipment and instrument are being evacuated to the roughing pump vacuum and when the instrument is evacuated to the diffusion pump vaccum. The multiple valve assemblies employed in the prior art are relatively expensive and are subject to being operated in an incorrect sequence. If the sequence is not performed correctly, there is a compromise of the vacuum of the roughing and/or diffusion pump. Of course, if the rough pump and/or diffusion pump vaccum is compromised, a considerable delay occurs before a desired vacuum of these pumps can be reached. A prior solution to this problem is described in my U.S. Pat. No. 4,399,690, which discloses a system using manually operated valves.

An entirely different approach to the proper sequencing of valves is to use solenoids to drive the valves with interconnected electrical controls to power the solenoids. The possibilities of building such a system are limited by the relative crudeness of commercially available solenoid-driven vacuum valves.

Since the leak detection system is often used as a diagnostic instrument for occasional trouble-shooting of various operational systems, it is desirable to provide a leak detection system which is portable and consumes a minimum of power for field use. Each component must be chosen or designed to operate efficiently.

Various gate valves, ball valves and other valves operated by solenoids for use in a vacuum system are known in the prior art. Weight and power efficiency are usually not an important consideration. Thus, to provide an improved electrically driven valve system for a leak detection system, it is necessary to re-think the design of the solenoid-driven vacuum valve.

OBJECTS OF THE INVENTION

It is, therefore, an object of the present invention to provide a new and improved solenoid-operated vacuum valve for use in a leak detection system.

Another object of the invention is to provide a solenoid-operated vacuum valve which automatically closes during a power failure.

A further object of the invention is to provide a solenoid-operated vacuum valve which has low impedance to flow at high vacuum and which is light weight, simple, economical, consumes little power, and which opens against atmospheric pressure.

BRIEF SUMMARY OF THE INVENTION

According to the invention a hard smooth ball, such as a large steel ball bearing, is held into a vacuum seal by a spring means to seal the valve. To open the valve a solenoid is used to move a bell-shaped actuator between the underside of the ball and an inside wall of a valve housing. The leverage of the actuator breaks the seal. Further small movement of the actuator causes the ball to roll to one side of the seal, thereby creating a low impedance to vacuum pumping. The valve thereby has high built-in mechanical advantages. Circuit means are used to reduce the current to the solenoid to a lower holding current while the valve is held open. During a power failure the solenoid releases and the spring returns the ball to a closed position.

These and further construction and operational characteristics of the invention will be more evident from the detailed description given hereinafter with reference to the figures of the accompanying drawings which illustrate preferred embodiments and alternatives by way of non-limiting examples.

DESCRIPTION OF THE PREFERRED EMBODIMENT

Figure 1:
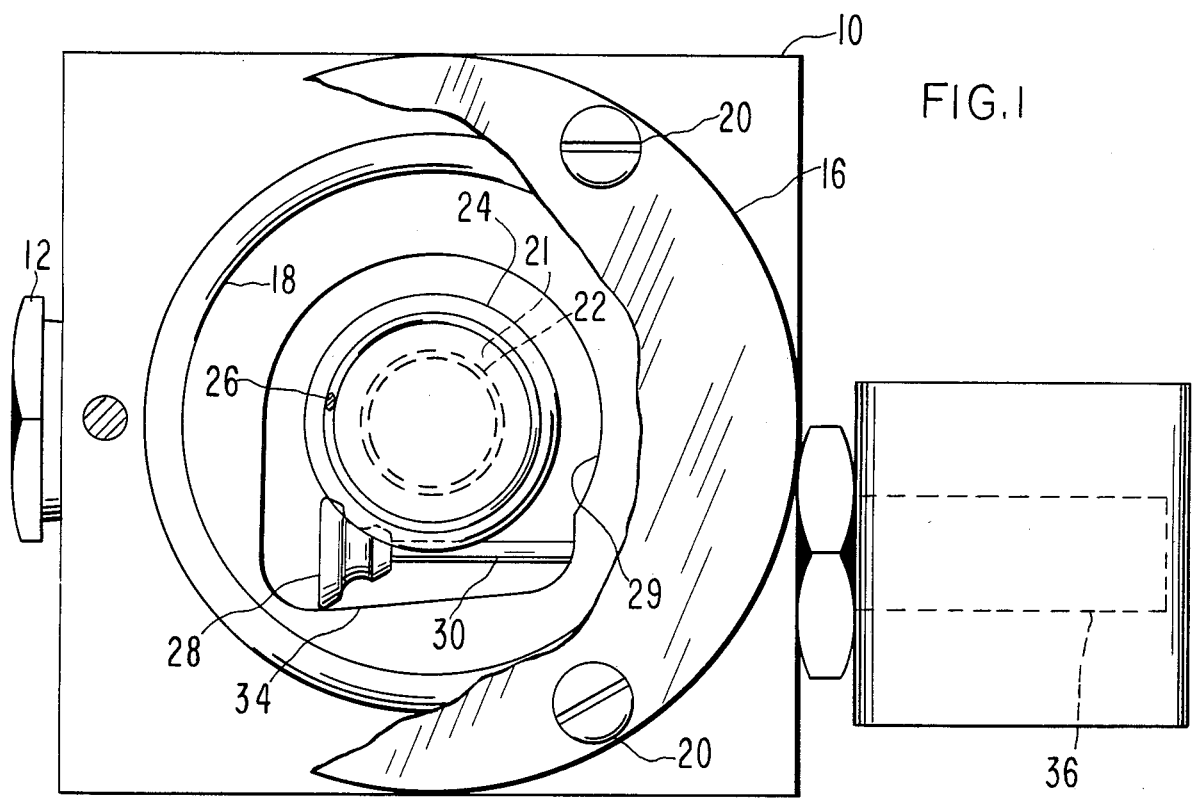
FIG. 1 shows a view from the top of the valve of the invention with portions cut away.
Figure 2:
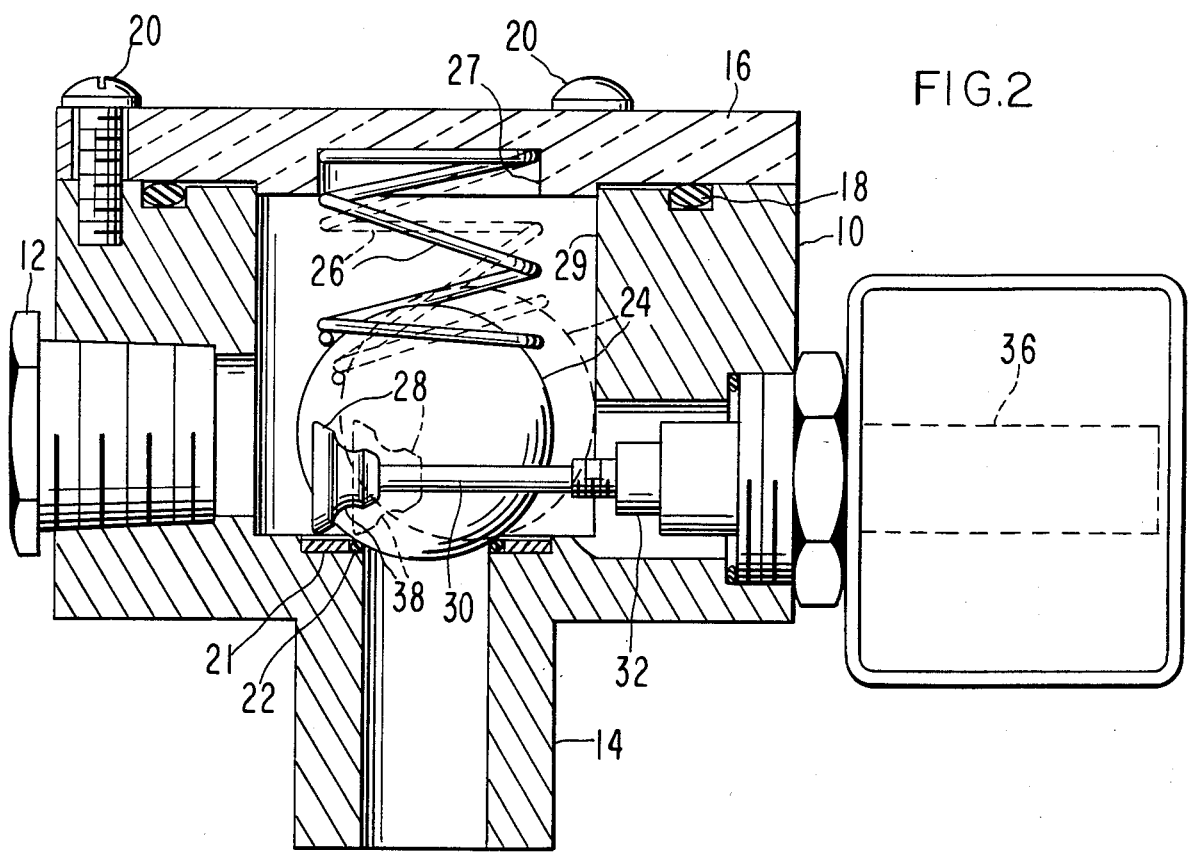
FIG. 2 shows a vertical sectional view through the valve of FIG. 1.

Referring now to the drawings wherein numerals are used to show the various parts thereof, there is shown in FIGS. 1 and 2 the valve of the invention. A valve housing 10 has a high pressure inlet 12, a low pressure outlet 14, and a cover plate 16 with O-ring 18 held with fasteners 20. An annular metal ring 21 with integral seal 22, such as a Parker Stat-O-Seal, is used to form a sealing seat inside the outlet 14. A hard smooth sphere 24, such as a steel ball bearing, fits inside the housing 10 and when pressed into the seal 22, closes the outlet 14. The sphere 24 is held to the seal 22 by means of a spring 26 captured at its upper end by a recess 27 in cover plate 16. An actuator 28, generally in the form of a frustrum of a cone, is moved between the sphere 24 and the inside and bottom walls of the valve housing 10 by means of a shaft 30 connected to a conventional solenoid core 32. The inner wall 34 of the housing 10 against which the actuator 28 slides is shaped so as to keep the sideways thrust on the shaft 30 at a minimum as the sphere 24 is moved. It will be noted that wall 34 slopes toward the axis of shaft 30 in the direction of outward movement of the shaft.

The solid line showing of sphere 24, spring 26 and actuator 28 in FIGS. 1 and 2 show the location thereof when the valve is fully closed, and the dash line showing in FIG. 2 depicts the position of these parts when the valve is fully open. At first movement of the actuator 28, the sphere 24 is lifted off the seal 22. Additional motion of the actuator 28 rolls the sphere 24 to the side of the housing where it is prevented from further movement by inside wall 29 of the housing. It will be noted that opening movement of the valve sphere 24 is caused solely by the force of actuator 28 acting to deform spring 26. Closing movement of the sphere is caused solely by the force of spring 26 in returning to its original position. The basis design criteria for actuator 28 is to have it provide a surface which will engage the surface of sphere 24 in such a way as to move the sphere off of its fully sealing contact with seal 22. In a preferred embodiment the actuator 28 has a generally frustoconical shape having its smaller end pointed in the direction of opening movement of the actuator. This causes the initial opening movement of the actuator to apply a relatively high displacement force against the sphere at the time when atmospheric pressure is holding the sphere 24 against the seal 22 in addition to the holding force exerted by the spring. As the opening movement of the actuator continues, its contact with the sphere transfers from the smaller end of the actuator toward its larger diameter end. During this motion the force required to increase the displacement of the spring is reduced, so that for a given pulling force on the actuator the larger diameter portion of the actuator is able to continue the deforming motion of the spring, and at a faster rate for a given travel of the actuator. It is also preferred to provide the actuator with a recess intermediate portion 38 in order to keep the small diameter portion of the actuator 28 bearing on the sphere 24 until the valve is fully opened.

The solenoid 32 has a moveable core (not shown) connected to the shaft 30. The core slides in a core tube 36. As is customary in conventional solenoids, the core tube includes a spring (not shown) between the closed right end of tube 36 and the inner end of the core, to provide a constant force for moving actuator 28 outwardly to its full-line open position so as to assure closing of sphere 24 in the event of power failure to the solenoid coil. The core tube 36 is sealed to the valve housing 10 so as to form an integral vacuum seal with the housing. The solenoid coil (not shown) is outside the core tube 36, eliminating the need to take electrical leads for the solenoid into the vacuum.

The valve thus described has a relatively large orifice for good conductance. In the event of power failure the valve closes automatically under the action of the spring. The conical shape of the actuator provides large movement of the ball with small movement of the actuator. The use of a solenoid moving inside the vacuum eliminates the need for bellows or other troublesome devices to transmit motion from outside the valve to the inside.

A high voltage can be applied to the solenoid for a short period of time to start the motion of the solenoid. A lower voltage can be used to hold the solenoid in the open position to reduce power consumption. A circuit means for applying these two different voltages to the solenoid is disclosed in my copending application entitled "Automatic Dual Voltage Switch for a Solenoid" Ser. No. 639,884, filed Aug. 13, 1984.

Figure 3:
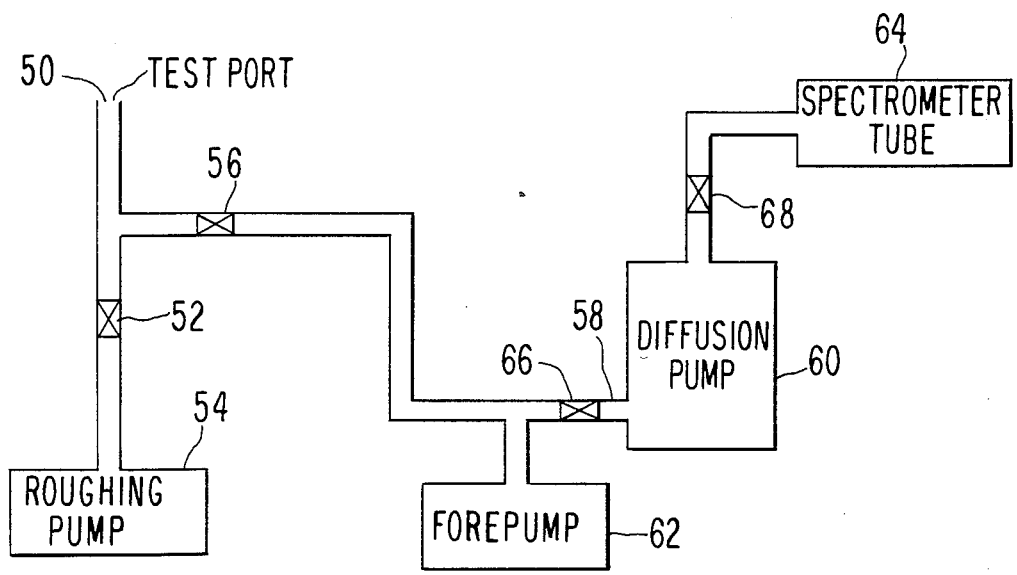
FIG. 3 shows a schematic diagram of a counterflow leak detection system incorporating the valve of the invention.

In FIG. 3 there is shown a schematic diagram of a counterflow type leak detection system incorporating the valves of the invention. A test port 50 is coupled through a roughing valve 52 to a roughing pump 54. The test port 50 is also coupled through a test valve 56 to the foreline 58 of a diffusion pump 60 and to a forepump 62. The foreline 58 is also coupled to forepump 62 through a valve 66. Forepump 62 maintains the required operating pressure at the foreline 58. The inlet to the diffusion pump 60 is coupled to the inlet of a spectrometer tube 64 through a valve 68. In operation, the roughing pump 54 initially evacuates the test port 50 and the test piece (or sniffer probe) to a pressure in the range of 100 to 300 millitorr. The test valve 56 is then opened, and the helium test gas drawn in through the test port 50 while valve 66 is open diffuses in reverse direction through the diffusion pump 60 to the spectrometer tube 64. Since the diffusion pump 60 has a much lower reverse diffusion rate for the heavier gases in the sample, it blocks these gases from the spectrometer tube 64, thereby efficiently separating the test gas. Two valves according to the invention, 66 and 68, are located adjacent to the foreline of the diffusion pump and the intake of the diffusion pump. In the event of a power failure the valves 66 and 68 automatically isolate the spectrometer tube 64 and the diffusion pump 60 to prevent backstreaming of gases from the pumps into the spectrometer tube 64 and from the forepump into the diffusion pump. In another mode the diffusion pump 60 can be shut down and isolated with the valves 66 and 68 so that the diffusion pump can be cooled without being pumped by the forepump. The valve of the invention can also be used to advantage as the roughing valve 52 and the test valve 56.

Figure 4:
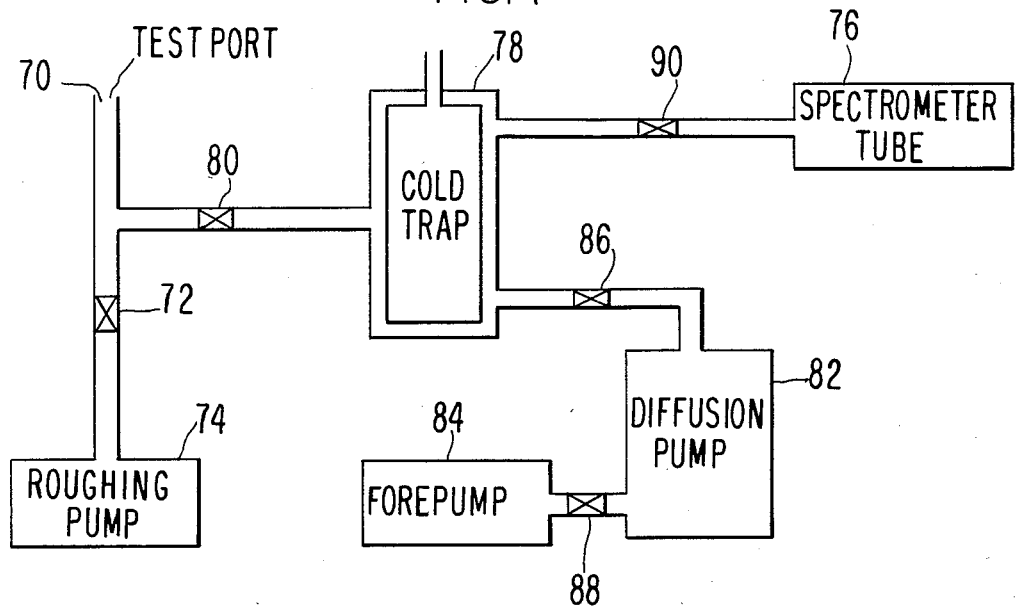
FIG. 4 shows a schematic diagram of a conventional leak detection system incorporating the valve of the invention.

A conventional leak detection system is illustrated in FIG. 4. A test port 70 is coupled through a roughing valve 72 to a roughing pump 74 which performs an initial roughing, or vacuum, pumping of the test port 70. A test piece or sniffer probe (not shown) is coupled to the test port 70. A spectrometer tube 76 has an inlet coupled through a cold trap 78 and a test valve 80 to the test port 70. The cold trap 78 is also coupled to the inlet of a diffusion pump 82 which has its foreline pressure maintained by a forepump 84 through a valve 88. In operation, the roughing pump 74 initially reduces the pressure at the test port 70 to approximately 15 millitorr. Test valve 80 is then opened. The cold trap 78, operating in combination with the diffusion pump 82, reduces the pressure at the test port 70 to the order of $2 \times 10^{-4}$ Torr, as required for operation of the spectrometer tube 76. The cold trap 78 removes water vapor and other condensable contaminants. The valves of the invention 86 and 88 are again used to isolate the diffusion pump during cool-down or in the event of power failure. A third valve 90 of the type of the invention can be used to protect the spectrometer tube in the event of power failure. The valve of the type of the invention can also be used at the roughing valve 72 and the test valve 80.

The configuration of FIG. 3 has a much higher test pressure than the configuration of FIG. 4, thereby facilitating vacuum pumping. Furthermore, leak testing of high gas load test pieces is more efficiently accomplished.

Figure 5:
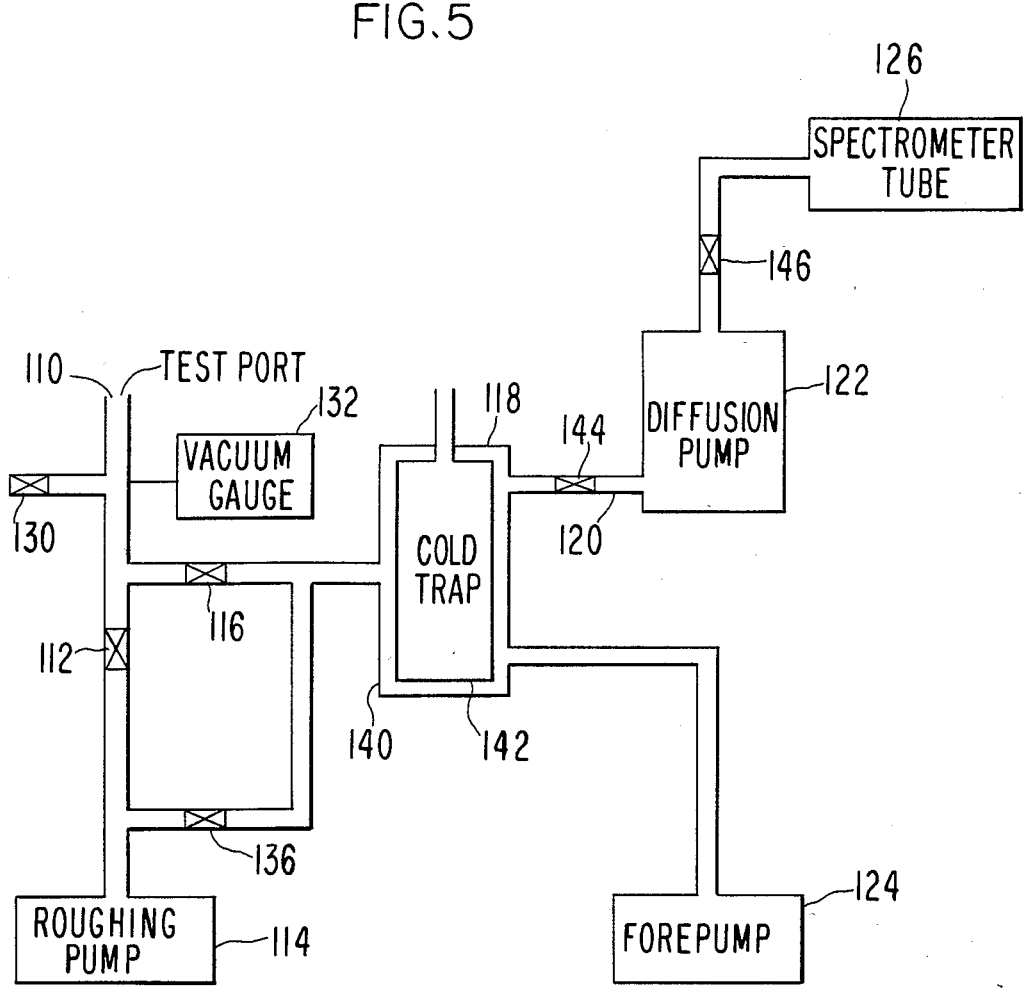
FIG. 5 shows a schematic diagram of a counterflow leak detection system with a cold trap incorporating the valve of the invention.

A leak detection system, in preferred embodiment, is shown in schematic form in FIG. 5. A test port 110 is coupled through a roughing valve 112 to a roughing pump 114. The various elements shown in FIG. 5 are coupled by suitable gas-tight connection such as 1⅛ inch O.D. tubing. The test port 110 is also coupled through a test valve 116 to an inlet of a cold trap 118. The outlet of the cold trap 118 is coupled to the foreline 120 of a diffusion pump 122. A forepump 124 is coupled to another port of the cold trap 118 and is in gas communication with the foreline 120 of the diffusion pump 122. An inlet of the diffusion pump 122 is coupled to an inlet of a spectrometer tube 126. A vent valve 130 and a vacuum gauge 132 are coupled to the test port 110. A gross leak valve 136 is coupled between the cold trap side of the test valve 116 and the roughing pump 114.

The cold trap 118 is a refrigeration system which condenses on a cooled surface vapors drawn into the leak detection system from the test piece or from the ambient atmosphere at the inlet to a sniffer probe. The cold trap 118 typically includes a cylindrical outer shell 140 and a smaller diameter inner shell 142 positioned within the outer shell 140. In a typical configuration, the outer shell 140 can have a diameter of about 5 inches, and the inner shell 142 can be spaced about one-half inch from the outer shell 140. The trace gas and other gases flowing between the test port 110 and the diffusion pump 122 circulate through the space between the outer shell 140 and the inner shell 142. A refrigerant material, such as liquid nitrogen, is introduced into the volume of the inner shell 142. Thus, gases passing through the cold trap 118 are condensed on the outer surface of the inner shell 142. Helium, due to its extremely low boiling point, is not condensed. The cold trap can have other physical configurations and can utilize other refrigerant materials. Such systems operate by providing a cold surface against which vapors condense. For example, the cold trap can employ a mechanical refrigerator with cooling coils placed in contact with the inner shell 142. Alternatively, a commercially available cryogenic pump can be utilized. The valves of the invention 144 and 146 are used to isolate the diffusion pump in several modes with advantages as described hereinabove.

In operation, a test piece not shown or a sniffer probe (not shown) is attached to the test port 110. The test piece may have one or more leaks which are to be detected by the system of FIG. 5. Initially, the test valve 116, the gross leak valve 136 and the vent valve 130 are closed and the roughing valve 112 is opened, thereby permitting roughing of the test piece (or the sniffer probe line) and the test port 110 to a pressure of approximately 100 to 300 millitorr. When this pressure is reached, the roughing valve 112 is closed, and the test valve 116 is opened. The opening and closing of the valves can be controlled manually, such as from an operator console, or can be controlled automatically by either a microprocessor control system or an electrical control system which receives inputs from the vacuum gauge 132. When the test valve 116 is opened, the cold trap 118 and the forepump 124 are operative in combination to maintain the pressure of the test piece or sniffer probe, the test port 110 and the foreline 120 of the diffusion pump 122 at a pressure on the order of 100 to 300 millitorr; and leak testing can proceed. The test gas, helium, is introduced onto the outer surface of the test piece, such as by a helium spray. Alternatively, if the test piece is pressurized with helium, then the sniffer probe is moved around the outside of the test piece. The helium is drawn through leaks into the interior of the test piece or is drawn into the sniffer probe, and passes into the leak detection system through the test port 110. The helium then passes around the cold trap 118 and into the diffusion pump foreline 120. As is known in the art, the helium, because of its light weight, diffuses in a reverse direction through the diffusion pump 122 to the spectrometer tube 126. The spectrometer tube 126 is tuned to detect and measure helium and to provide an output signal which is proportional to the quantity of helium in the gas sample received from the test piece or sniffer probe. The helium concentration is proportional to the leak rate of the test piece. While the diffusion pump 122 passes only a specified fraction of the helium to the spectrometer tube 126, a sufficient quantity reaches the spectrometer tube 126 to permit a highly accurate reading of leak rate. After leak testing is complete, the test valve 116 is closed; and the vent valve 130 is opened to vent the test piece to atmosphere and permit its removal. When a sniffer probe is used, the helium is collected from the leaking test piece by the sniffer probe which is connected to the test port 110.

The gross leak valve 136 provides the capability to leak test pieces with very high leak rates. When a gross leak test is performed, the test valve 116 and the gross leak valve 136 are initially closed, and the roughing valve 112 is open to permit rough pumping of the test piece or sniffer probe line and the test port. Then the roughing valve 112 remains open, the test valve 116 remains closed and the gross leak valve 136 is opened in order to conduct a leak test. The roughing pump 114 is connected to the test port 110 and assists in maintaining the required test pressure.

This invention is not limited to the preferred embodiments heretofore described, to which variations and improvements may be made, without leaving the scope of protection of the present patent, the characteristics of which are summarized in the following claims.

What is claimed is:

1. Apparatus for leak detection comprising:
   a test port adapted for receiving a trace gas from a subject being tested;
   a gas analysis instrument tuned to detect said trace gas and having an inlet for receiving said trace gas;
   a first vacuum pumping means characterized by a relatively high reverse diffusion rate for light gases and a relatively low reverse diffusion rate for heavy gases, said first vacuum pumping means having a pump inlet coupled to said inlet of said gas analysis instrument, and a foreline;
   a second vacuum pumping means coupled between said test port and said foreline of said first vacuum pumping means;
   two valves for isolating said first vacuum pumping means coupled respectively to said inlet and said foreline of said first vacuum pumping means, each said valve including a valve housing having a high pressure inlet and low pressure outlet, an annular means for sealing inside said low pressure outlet, a smooth hard sphere of size sufficient to close said low pressure outlet when held against said annular sealing means, a coil spring for holding said sphere against said annular sealing means, and an actuator adapted and constructed to move said sphere away from said annular sealing means when said actuator is forced against said sphere;
   said actuator being connected to a drive shaft adapted for movement along a path offset from and transverse to the axis of said coil spring, said actuator and said shaft being located on the same side of said annular sealing means as said sphere;
   said actuator having a frustoconical surface positioned to contact the side of said sphere and oriented such that the small end of the frustoconical surface points in the valve-opening direction of movement along said path;
   said valve housing having an inner wall surface against which said actuator slides during movement along said path; and
   said drive shaft being driven by a solenoid so that in the event a power failure causes stoppage of said pumps, said two valves will automatically be closed by said spring and isolate said first pumping means.

2. A valve comprising:
   a valve housing having a high pressure inlet and low pressure outlet;
   an annular means for sealing inside said low pressure outlet;
   a smooth hard sphere of size sufficient to close said low pressure outlet when held against said annular sealing means;
   a spring means for holding said sphere against said annular sealing means;
   an actuator adapted and constructed to move said ball away from said annular sealing means when said actuator is forced between said ball and inside wall of said housing;
   said actuator being connected to a drive shaft adapted for movement along a path offset from and transverse to the axis of said coil spring, said actuator and said shaft being located on the same side of said annular sealing means as said sphere;
   said actuator having a frustoconical surface positioned to contact the side of said sphere and oriented such that the small end of the frustoconical surface points in the valve-opening direction of movement along said path;
   said valve housing having an inner wall surface against which said actuator slides during movement along said path; and
   said drive shaft being driven by a solenoid so that in the event a power failure causes stoppage of a pump, said valve will automatically be closed by said spring and isolate pump.

3. A valve as defined in claim 2 including a solenoid means for moving said actuator.

4. A valve as defined in claim 3 wherein said solenoid is adapted and constructed to operate in a vacuum without electrical leads penetrating a vacuum sealing wall.

5. A valve as defined in claim 2 wherein said hard smooth sphere is a steel ball bearing.

6. A valve comprising:
   a valve housing having an inlet and an outlet;
   an annular valve seat inside said housing;
   a valve member having a spherical portion of size sufficient to close off fluid flow when held against said valve seat;
   spring means for holding said spherical portion of the valve member against said valve seat;
   an actuator adapted and constructed to move said spherical portion of the valve member away from said valve seat in a direction having a component transverse to the axis of said valve seat;
   said actuator being connected to a drive shaft adapted for movement along a substantially straight-line path; and
   said actuator having a surface portion adapted to contact said spherical portion of the valve member, said surface portion of the actuator having two surface areas sloped away from the center of said spherical portion in the direction of valve-opening movement of said shaft, and a recessed surface area intermediate said sloped surface areas.

7. A valve as defined in claim 6 wherein said valve member is a complete sphere, and said spring is shaped such that it applies a greater force for holding said sphere in fully closed position against said valve seat than the spring exerts to return the sphere from fully open position toward the fully closed position.

8. A valve as defined in claim 7 wherein said valve housing includes an internal wall engaged by said actuator throughout movement of the actuator, whereby sideways thrust on the actuator caused by said spring means is resisted by said internal wall.

9. A valve comprising:

a valve housing having an inlet and an outlet;

an annular valve seat inside said housing;

a valve member having a spherical portion of size sufficient to close off fluid flow when held against said valve seat;

spring means for holding said spherical portion of the valve member against said valve seat; and an actuator adapted and constructed to move said spherical portion of the valve member away from said valve seat in a direction having a component transverse to the axis of said valve seat; said valve member being a complete sphere, said actuator engaging the side of said sphere, said actuator being shaped such that initial movement of the actuator in the direction to move the sphere away from said valve seat applies a force against the sphere higher than the force applied when the sphere is moved to its fully open position, said spring being shaped such that it applies a greater force for holding said sphere in fully closed position against said valve seat than the spring exerts to return the sphere from fully open position toward the fully closed position, said valve housing including an internal wall engaged by said actuator throughout movement of the actuator, and said wall being so shaped as to confine the actuator to a substantially linear path of travel as said sphere is displaced during said movement.

* * * * *